Aug. 31, 1948.　　　I. W. MANNERBRINK ET AL　　　2,448,106
THREAD CHECKING APPARATUS

Filed Aug. 9, 1944　　　　　　　　　　　　　　3 Sheets-Sheet 1

Aug. 31, 1948.  I. W. MANNERBRINK ET AL  2,448,106
THREAD CHECKING APPARATUS
Filed Aug. 9, 1944  3 Sheets-Sheet 2

Inventors:
Ivan Waldemar Mannerbrink
Nils Johan Ludvig Sandström
by their Attorneys
Howson & Howson

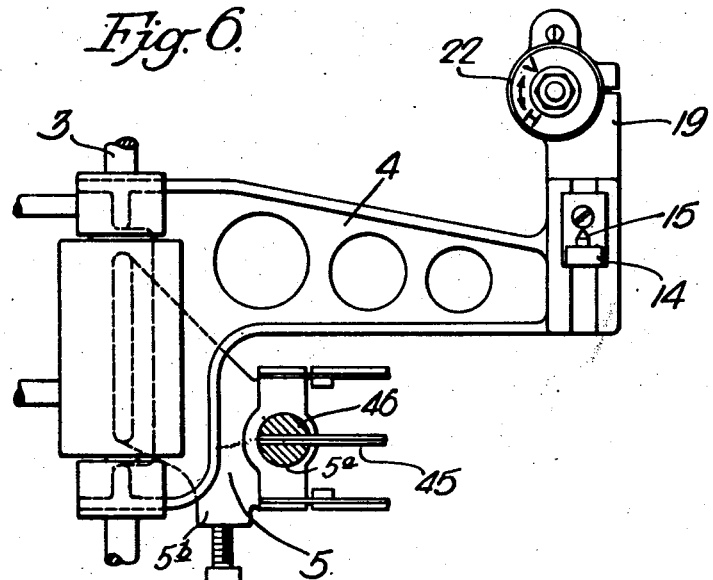
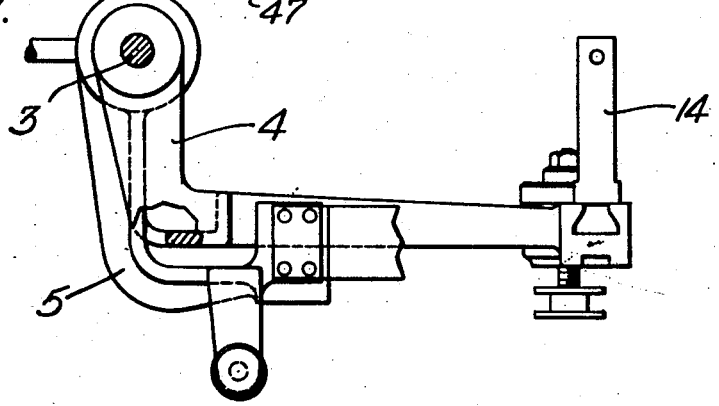
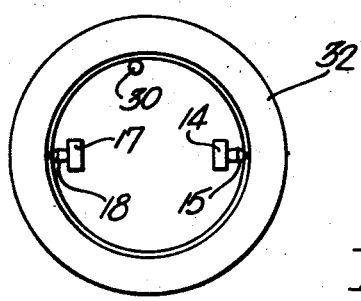

Patented Aug. 31, 1948

2,448,106

UNITED STATES PATENT OFFICE 2,448,106

THREAD CHECKING APPARATUS

Ivan Waldemar Mannerbrink and Nils Johan Ludvig Sandström, Goteborg, Sweden, assignors to SKF Industries, Inc., Philadelphia, Pa., a corporation of Delaware Application August 9, 1944, Serial No. 548,716
In Sweden August 12, 1943

9 Claims. (Cl. 33—199)

The present invention relates to a thread checking apparatus and has for its purpose to provide an instrument for rapid and easy check of the diameters of threaded parts. The apparatus is specially suitable for checking the fit of threaded parts.

Figure 1:
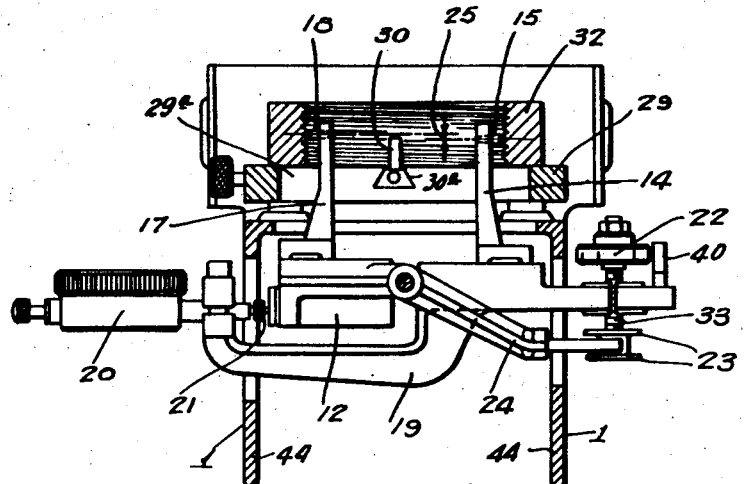
Figure 2:
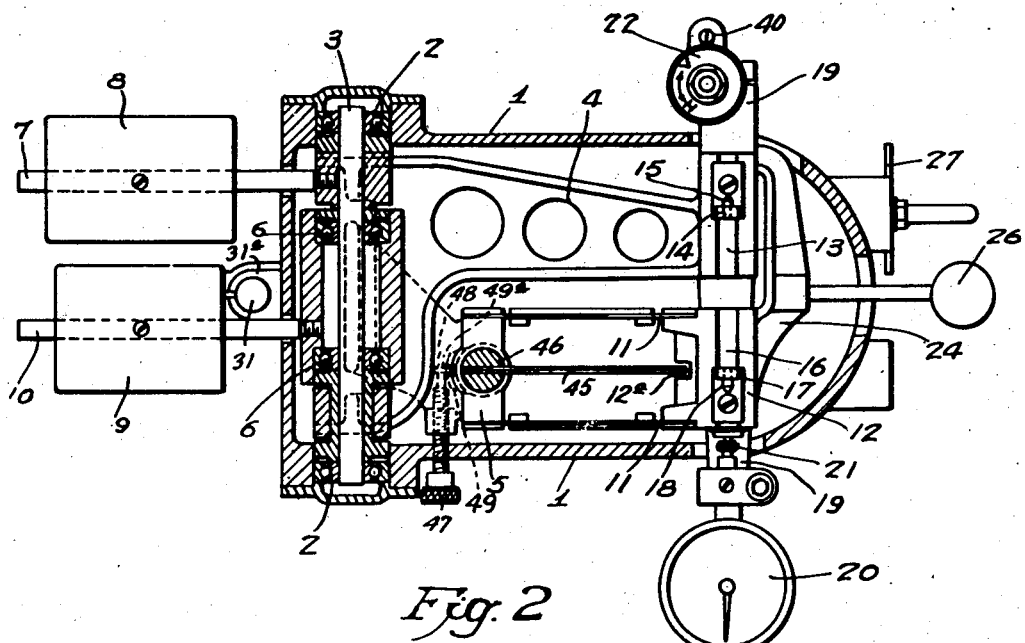
Figure 3:
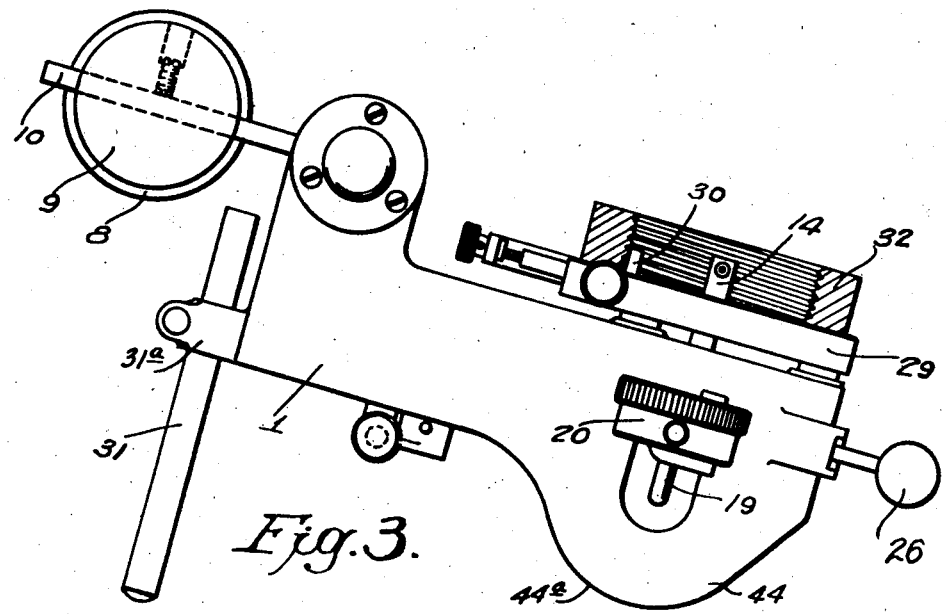
Figure 4:
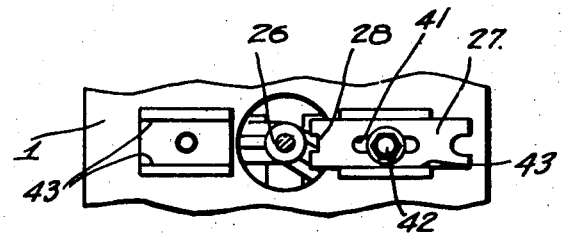
Figure 5:
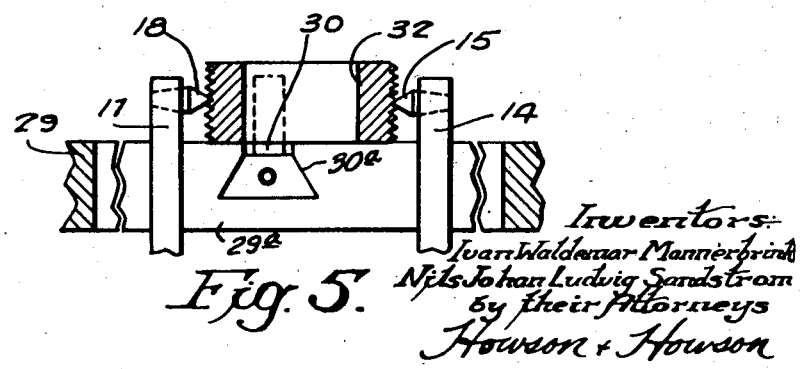

One embodiment of the invention is illustrated on the accompanying drawings, in which Fig. 1 shows a vertical section through the apparatus and Fig. 2 is a horizontal section through the same. Fig. 3 shows a side view of the apparatus. Fig. 4 shows on a larger scale means for positioning the arms of the apparatus during operation. Fig. 5 shows also on a larger scale, the location of the measuring points when checking external threads. Fig. 6 is a fragmentary plan view of two of the elements of the apparatus in the relative positions which they occupy in assembly. Fig. 7 is a side elevational view of the sub-assembly shown in Fig. 6, and Fig. 8 is a diagrammatic plan view illustrating a structural and functional detail of the apparatus A shaft 3 is mounted on ball bearings 2 in a frame 1. On the shaft 3 is rigidly mounted a rigid arm 4 which thus can oscillate with the shaft. Another oscillatory arm 5 is mounted on the shaft 3 by means of a pair of ball bearings 6 and thus is capable of oscillation not only relative to the shaft 3 but also relative the arm 4. In other words, both arms will oscillate about the axis of the shaft 3, the arm 4 with the shaft and the arm 5 independently of the shaft, so that the arms may assume various angles with respect to each other, each in its individual plane of oscillation perpendicular to the shaft axis.

As shown in Fig. 2, the arm 4 is forked at the end which is attached to the shaft 3 and the ball bearing mount for the arm 5 is between the forks of the arm 4. The relationship of the two arms may be better understood by reference to Fig. 6 and 7 of the drawings which show the arms in the relative positions assumed in the assembly.

Slidably mounted on a bar 7 screwed to the arm 4 is a counterweight 8 and another slidable counterweight 9 is mounted on a bar 10 screwed to the arm 5. By the aid of these two slidable weights 8 and 9 the whole arm mechanism can be balanced in a manner which makes it easily movable around the bearings. The device is therefore more convenient than others having slides or the like.

The arm 4 is rigid, but the arm 5 is in two parts, connected to each other by means of two leaf springs 11. Through this arrangement the outer part 12 of the arm can make a parallel sidewise movement relative to the inner part of the arm, that is to say, parallel to the oscillatory axis of the arm 5. This movement is also relative to the rigid arm 4. Slidably mounted in a groove 13 in the arm 4 is adjustable vertical arm 14, which has a thread contact point 15. In a similar groove 16 in the outer part 12 of the arm 5 is a similarly slidably adjustable vertical arm 17 provided with thread contact point 18. The points 15 and 18 are thus movable relative to each other. The points are conical with an apex angle equal to the thread angle. They therefore correspond to the theoretical thread profile and thus permit an exact checking of the fit of the work piece. On an arm 19 perpendicular to and supported by the arm 4 is a dial indicator gage 20, the measuring point 21 of which abuts against a surface on the movable outer part 12 of the arm 5. The arm 19 is integral with or rigidly attached to the arm 4. The relative movement and the relative positions of the part 12 and the rigid arm 4, i. e. between the thread contact points 15 and 18, can thus be read on the indicator dial 20. The arm 19 is prolonged in the opposite direction and has a screw 33, which can be adjusted in the arm and is provided with a scale 22, by the aid of which the position of the screw can be read. Coacting with the scale 22 is a relatively fixed pin 40 (see Figs. 1 and 2), said pin, with the scale, affording a means for indicating the angular position of the screw 33 and hence the axial or longitudinal adjustment thereof in the arm 19. As described below, the screw constitutes a medium for adjusting the relative height of, or the difference in height between, the points 15 and 18, as indicated at 25 in Fig. 1, and the scale 22, usually graduated in tenths of millimeters, will indicate such difference.

The screw carries at its lower end two discs 23 which loosely embrace one end of an arm 24 perpendicular to the movable arm 5, said arm 24 being fastened to the part 12 of the arm 5. The arms 4 and 5 are therefore coupled to one another and consequently oscillate together around the axis of the shaft 3, but their relative position can be adjusted by means of the screw 33 and the scale 22. Because of the play in the coupling which permits of a certain motion between the arms, it is always possible for the thread contact points to enter the thread. As illustrated in Fig. 1 their mutual position is adjusted in such manner that the vertical distance 25 between the points 15 and 18 will be equal to half of the pitch of the thread. Fastened to the arm 24 of the part 12 is a handle 26, by the aid of which the arm system can be manipulated as a unit about the axis of shaft 3, and the movable part 12 of the arm can be moved sideways with respect to the arm 4.

At the end of the frame is fastened a plate 27 having a notch 28 (Fig. 4). The notch 28 has for its purpose to position the handle 26 when the same is moved sideways. The reason for this is that since the measuring points are mounted on the ends of oscillable arms, they thus move along arcs of circles. Consequently the result of the checking operation is influenced to some extent, although indeed very inconsiderably, by the position on the arcs, at which the contact points happen to be located when the reading is made. The notch ensures that, when checking a series of similar work pieces, the arms will always assume the same positions and consequently, this inconvenience is avoided. The plate 27 is provided with a slot 41 which permits it to be slid along guides 43 on the frame 1 and to be locked in desired position of adjustment by means of a screw 42. The plate 27 can also be applied on the other side of the handle 26 in corresponding guides 43a, when necessary, which will be the case when the apparatus is used for checking external threads and the thread contact points are applied as shown in Fig. 5

The work rest 29 is attached to the upper surface of the frame by screws (not shown). The rest is substantially circular in shape (although this is immaterial) and is provided with a slot 29a through which the arms 14 and 17 project.

The work rest is provided with an adjustable pin 30 which serves to position the work piece, and when the apparatus has been adjusted for the thread diameter to be checked the work piece will assume of its own accord, when resting against the pin 30 and the point 15, such a position that the points 15 and 18 will be on one of its diameters. In order to cause the workpiece to assume a position in contact with the pin 30, the work rest is inclined, and the inclination of the work rest can be altered by adjusting the length of an adjustable leg 31 on the frame. To this latter end the frame is formed with a pair of feet 44 having curved surfaces 44a which rest upon the underlying surface. At its other end the frame is supported by the leg 31 which, as stated above, is adjustable in the frame so as to adjust the height of that end of the frame and, thereby, the inclination of the frame as a whole. As shown in Figs. 2 and 3, the leg 31 passes through and is releasably clamped in a split collar 31a on the frame.

The pin 30 is of circular cross section and is adjustable longitudinally of a dovetail slot 30a in the work rest 29 at right angles to a line between the points 15 and 18. As stated above, it is positioned in the slot so that when it is engaged with the threaded surface of the work piece the points 15 and 18 will be located on a diameter of the thread. This is illustrated in Fig. 8 of the drawings, wherein the work piece 32 is shown in the normal relationship to the pin 30 and points 15 and 18. If the pin is located to the left of the radial line normal to the diametrical line defined by the points 15 and 18, as shown, the work piece will tend to fall against the fixed point 15.

The apparatus is used in the following manner. The weight of the arms is counter balanced by the aid of the weights 8 and 9, and the inclination of the work rest is fixed. Thereupon the vertical distance between the arms (i. e. distance between the measuring points) relative to one another is adjusted by means of the screw 33 and the scale 22. The distance between the measuring points is adjusted so that with the work piece in position, as described above, the two points 15 and 18 will normally lie sufficiently far apart to reach to the bottom of the thread, but will be sufficiently close together in the normal positions to permit retraction of the point 18 to an extent permitting insertion and subsequent release of the work piece from between the points. As stated, the pin 30 is positioned so that the measuring points will contact with the threads of a master ring on a diameter and the indicator dial is adjusted to zero position. The apparatus is now ready for use. When placing the workpiece 32 on the rest, the measuring point 18, when checking internal threads, is moved towards the point 15, which means that the handle 26 shall be moved to the right until it engages the notch 28. This has the double effect of removing the point 18 to a retracted position free from interference with the workpiece, so that the latter may be placed in the apparatus, and of establishing the points in predetermined angular positions with respect to the axis of shaft 3, in which positions the points are to operate in the checking operation. The work piece is turned until the fixed measuring point enters the thread. Then the handle 26 is released and the movable point, by action of the spring 45 hereinafter described, automatically enters the proper thread and the reading is made while the work piece, is rotated whereupon the handle 26 is again moved to the right, the work piece is removed, and another work piece is inserted. The measuring points can freely follow the thread, while the work piece is being rotated, which makes it possible to check the roundness of the thread.

With reference to Fig. 2, it will be noted that a leaf spring 45, mounted in the arm 5, extends outwardly between the springs 11 and terminates in a recess 12a in the member 12. The spring 45 is supported in a cylindrical member 46 which is mounted for rotational adjustment in a vertical socket 5a in the arm 5, such adjustment being effected in the present instance by means of a screw 47 threaded into a depending lug 5b of the arm 5 and having a flange 48 which extends into a notch 49a in a member 49 fixed to the lower end of the member 46. By adjustment of the screw 47 the spring 45 may be made to exert a biasing pressure on the member 12 tending to displace that member and the point 18 which it carries either toward or away from the arm 4 and the relatively fixed point 15. Where the gauge is to be used on an internal thread the said resilient bias will be away from the point 15; and when an external thread is to be checked the bias will be toward the point 15. This device permits the springs 11 to function solely for the support and guidance of the member 12 and provides an adjustable means for obtaining a regulated pressure of the points against the thread of the work piece whether internal or external.

Having thus described our invention, we claim and desire to secure by Letters Patent the following:

1. Thread diameter checking apparatus comprising a frame having a work-receiving table for supporting a workpiece, a pair of thread contact points, a pivotal support for each of said points, means for mounting said supports in the frame for oscillation about a common axis in parallel planes substantially normal to the plane of the work-receiving table, said points being oppositely directed on a line substantially parallel with said common axis, and means movably connecting one of said supports and its associated point for permitting movement of said point toward and from the other, said connection guiding said point in said movement in a path substantially parallel to the said common axis.

2. Thread diameter checking apparatus comprising a frame having a work-receiving table for supporting a workpiece, a pair of thread contact points, a support for each of said points pivotally mounted in the frame on a common axis substantially parallel to the plane of said work-receiving table, said points being oppositely directed on a line substantially parallel with said common axis, and a movable guiding and connecting means between one of said supports and its associated point for permitting movement of said point with respect to the other, said last mentioned means guiding said point for movement on a line substantially parallel to said common axis.

3. Thread diameter checking apparatus comprising a frame having a work-receiving table for supporting a workpiece, a pair of arms, a means for pivotally supporting said arms in the frame for free and independent oscillation about a common axis in parallel planes substantially normal to the plane of the work-receiving table, a pair of oppositely directed thread contact points mounted one on each of said arms and each directed transversely of its arm on a line substantially parallel to the plane of said table, a movable guiding and connecting means between one of said contact points and its support for permitting movement of said point toward and from the other of said points in a path substantially parallel to said common axis, said last mentioned means guiding said point during such movement, and means for so moving said point.

4. Thread diameter checking apparatus comprising a frame having a work-receiving table for supporting a workpiece, an axle rotatably mounted in the said frame substantially parallel with the plane of the said work-receiving table, an arm fixed to the said axle and another arm mounted for oscillation on and about the said axle, a pair of oppositely directed thread contact points mounted one on each of said arms and directed transversely thereto, and a movable guiding and connecting means between one of said arms and its associated point for permitting movement of said point on its arm in the said transverse direction, said last mentioned means guiding said point for movement in said transverse direction.

5. Thread diameter checking apparatus comprising a frame having a work-receiving table for supporting a workpiece, a pair of arms, means for pivotally mounting said arms in the frame for free and independent oscillation about a common axis in parallel planes substantially normal to the plane of the work-receiving table, a pair of oppositely directed thread contact points carried one on each of said arms and directed transversely thereto, and resilient guiding and connecting means between one of said points and its associated arm for permitting guided movement of said point in the said transverse direction and with respect to said arm.

6. Thread diameter checking apparatus comprising a frame having a work-receiving table for supporting a workpiece, a pair of arms, means for pivotally mounting said arms in the frame for free and independent oscillation about a common axis substantially parallel with the plane of the work-receiving table, said arms being positioned on the same side of said common axis, and slidable weights connected to said arms and positioned on that side of said common axis opposite that on which said arms are positioned, said weights counterbalancing the weight of the arms, a pair of oppositely directed thread contact points carried one on each of said arms and directed transversely thereto, and a movable guiding and connecting means between one of said arms and its associated point for permitting movement of said point on its arm in the said transverse direction, said last mentioned means guiding said point for movement in said transverse direction.

7. Thread diameter checking apparatus comprising a frame having a work-receiving table for supporting a workpiece, a pair of arms, means for pivotally mounting said arms in the frame for free and independent oscillation about a common axis substantially parallel with the plane of the work-receiving table, adjustable coupling members connecting the arms for adjusting the relative angular position of the arms about said common axis, a pair of oppositely directed thread contact points carried one on each of said arms and directed transversely thereto, and a movable guiding and connecting means between one of said arms and its associated point for permitting movement of said point in the said transverse direction, said last mentioned means guiding said point for movement in said transverse direction.

8. Thread diameter checking apparatus comprising a frame having a work-receiving table for supporting a workpiece, a pair of arms, means for pivotally mounting said arms in the frame for free and independent oscillation about a common axis substantially parallel with the plane of the work-receiving table, adjustable coupling members connecting the arms for adjusting the approximate relative angular position of the arms about said common axis, there being a limited slackness between the coupling members whereby there may be limited free relative movement between the arms, a pair of oppositely directed thread contact points carried one on each of said arms and directed transversely thereto, and a movable guiding and connecting means between one of said arms and its associated point for permitting movement of said point in the said transverse direction, said last mentioned means guiding said point for movement in said transverse direction.

9. Thread diameter checking apparatus comprising a frame having a work-receiving table for supporting a workpiece, a pair of arms, means for pivotally mounting said arms in the frame for free and independent oscillation about a common axis substantially parallel with the plane of the work-receiving table, a pair of oppositely directed thread contact points mounted one on each of said arms and directed transversely thereto, a movable guiding and connecting means between one of said arms and its associated point for permitting movement of said point on its arm in the said transverse direction, said last mentioned means guiding said point during its movement in said transverse direction, a handle for effecting said movement, adjustable coupling means for connecting the arms in predetermined relative angular positions with respect to the said axis, and means on the frame for engaging the said handle to determine the position of the arms relative to the frame during application of the workpiece to the work-receiving table.

IVAN WALDEMAR MANNERBRINK.
NILS JOHAN LUDVIG SANDSTRÖM.

REFERENCES CITED

The following references are of record in the file of this patent:

UNITED STATES PATENTS

| Number | Name | Date |
| --- | --- | --- |
| 1,456,938 | Schoof | May 29, 1923 |
| 1,563,046 | Sears et al. | Nov. 24, 1925 |
| 1,674,875 | Schaurte | June 26, 1928 |
| 1,854,242 | Allison et al. | Apr. 19, 1932 |
| 1,950,912 | Aronson | Mar. 13, 1934 |
| 2,409,924 | Bauer | Oct. 22, 1946 |